US010057115B2

(12) United States Patent
Baca et al.

(10) Patent No.: US 10,057,115 B2
(45) Date of Patent: Aug. 21, 2018

(54) DEVICE RESOURCE MANAGEMENT BASED ON CONTEXTUAL PLANNING

(71) Applicant: Intel Corporation, Santa Clara, CA (US)

(72) Inventors: Jim S. Baca, Corrales, NM (US); David Stanasolovich, Albuquerque, NM (US); Mark H. Price, Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 13/997,770

(22) PCT Filed: Mar. 13, 2013

(86) PCT No.: PCT/US2013/030744
§ 371 (c)(1),
(2) Date: Nov. 6, 2013

(87) PCT Pub. No.: WO2014/142819
PCT Pub. Date: Sep. 18, 2014

(65) Prior Publication Data
US 2014/0280794 A1   Sep. 18, 2014

(51) Int. Cl.
*G06F 15/177* (2006.01)
*H04L 12/24* (2006.01)
(Continued)

(52) U.S. Cl.
CPC ..... *H04L 41/0806* (2013.01); *G06Q 10/1093* (2013.01); *G06Q 30/0255* (2013.01);
(Continued)

(58) Field of Classification Search
CPC ............. H04L 41/0803; H04L 41/0816; H04L 41/0886; G06Q 10/1093
(Continued)

(56) References Cited

U.S. PATENT DOCUMENTS 8,326,793 B1 * 12/2012 Bowers ..................... G06F 9/50
706/45
8,510,247 B1 * 8/2013 Kane, Jr. .................. G06N 5/02
706/46
(Continued)

FOREIGN PATENT DOCUMENTS

CN      1475092 A     2/2004
CN      1574873 A     2/2005
(Continued)

OTHER PUBLICATIONS

International Search Report and Written Opinion received for International Patent Application No. PCT/US2013/030744, dated Aug. 30, 2013, 11 pages.
(Continued)

*Primary Examiner* — Liangche A Wang
*Assistant Examiner* — Kaylee Huang
(74) *Attorney, Agent, or Firm* — Barnes & Thornburg LLP

(57) ABSTRACT

Technologies for resource management include a mobile computing device configured to communicate with a resource database server. The mobile computing device determines a future context and sends a request to the server for resource information associated with a location defined by the future context. The server determines resources located at the location and sends the requested resource information to the mobile computing device. The mobile computing device automatically configures itself to use the resources. The mobile computing device may automatically download and configure device drivers for the resources. The resources may include printers, displays, and network connections. The resource information may be provided by third-party resource providers. The resource database server may provide recommendations, including travel information recommendations. The mobile computing device may moni-
(Continued)

tor its current context and enable the resources at the location or notify a user of the availability of the resources.

12 Claims, 6 Drawing Sheets

(51) Int. Cl.
| | | |
|---|---|---|
| *H04W 4/029* | (2018.01) | |
| *H04L 29/08* | (2006.01) | |
| *G06Q 10/10* | (2012.01) | |
| *H04W 4/02* | (2018.01) | |
| *H04W 4/04* | (2009.01) | |
| *G06Q 30/02* | (2012.01) | |

(52) U.S. Cl.
CPC ...... *H04L 41/0816* (2013.01); *H04L 41/0886* (2013.01); *H04L 67/16* (2013.01); *H04L 67/22* (2013.01); *H04L 67/34* (2013.01); *H04W 4/028* (2013.01); *H04W 4/029* (2018.02); *H04W 4/043* (2013.01); *H04L 67/26* (2013.01)

(58) Field of Classification Search
USPC ....... 709/220, 221, 223, 224, 225, 226, 217, 709/218, 219
See application file for complete search history.

(56) References Cited

U.S. PATENT DOCUMENTS

| | | | | |
|---|---|---|---|---|
| 8,959,168 | B2* | 2/2015 | Praun | H04L 51/00 709/203 |
| 2006/0152760 | A1* | 7/2006 | Hong | G06F 3/1204 358/1.15 |
| 2008/0281974 | A1 | 11/2008 | Slothouber et al. | |
| 2009/0077217 | A1* | 3/2009 | McFarland | G06Q 10/06 709/223 |
| 2009/0143078 | A1* | 6/2009 | Tu | H04W 8/18 455/456.3 |
| 2010/0241663 | A1 | 9/2010 | Huang et al. | |
| 2011/0061008 | A1* | 3/2011 | Gupta | G06F 17/30598 715/764 |
| 2011/0119478 | A1 | 5/2011 | Jackson | |
| 2012/0034904 | A1 | 2/2012 | Lebeau et al. | |
| 2012/0050012 | A1* | 3/2012 | Alsina | H04N 21/4126 340/10.1 |
| 2012/0151358 | A1 | 6/2012 | Joanny et al. | |
| 2013/0055370 | A1* | 2/2013 | Goldberg | G06F 21/31 726/7 |
| 2013/0102283 | A1* | 4/2013 | Lau | H04W 12/06 455/411 |
| 2013/0345961 | A1* | 12/2013 | Leader | G01C 21/20 701/410 |

FOREIGN PATENT DOCUMENTS

| | | |
|---|---|---|
| CN | 1754147 A | 3/2006 |
| CN | 101529834 A | 9/2009 |
| CN | 102892071 A | 1/2013 |
| WO | WO2012/072862 A1 * | 6/2012 |

OTHER PUBLICATIONS

"Context awareness," Wikipedia, The Free Encyclopedia, retrieved from: <http://en.wikipedia.org/w/index.php?title=Context_awareness&oldid=502776114>, edited Jul. 17, 2012, 5 pages.
European Search Report for Application No. 13877638.0-1853/2972934, dated Oct. 7, 2016, 7 pages.
Office Action for Chinese Patent Application No. 201380072917.6, dated Nov. 28, 2016, 9 pages.
English Translation of Search Report for Chinese Patent Application No. 201380072917.6, dated Nov. 11, 2016, 3 pages.
Office Action for European Patent Application No. 14194775.4-1958, dated Mar. 17, 2017, 7 pages.
Office Action and English Translation for Chinese Patent Application No. 201380072917.6, dated Jul. 11, 2017, 16 pages.

* cited by examiner

US 10,057,115 B2

DEVICE RESOURCE MANAGEMENT BASED ON CONTEXTUAL PLANNING

BACKGROUND

Computing devices, especially mobile computing devices such as "smart" phones, are becoming ubiquitous tools for personal, business, and social uses. Today's computing devices are often armed with significant processing power, data storage, and various sensors such as location sensors. The inclusion of such sensors allows computing devices to determine aspects of the context of the computing device itself and/or the user (e.g. the current location, weather, etc.). For example, contextual computing allows an associated computing device to tailor its operation to its current context, which is most often defined by its location. Typical contextual computing systems sense and react to the current device context, either in real time or after-the-fact.

Interoperability of computing devices with other resources, such as printers, display devices, and other computing devices, further promotes the utility of personal computing devices. However, configuring a computing device to properly interface with such other resources can be difficult. Oftentimes, the identity of the other resources may be unknown. Additionally, the particular configuration settings required to properly interact with such resources may be difficult or impossible to obtain in a timely manner. As such, effecting interoperability between computing devices and other resources can be a challenge for many users.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
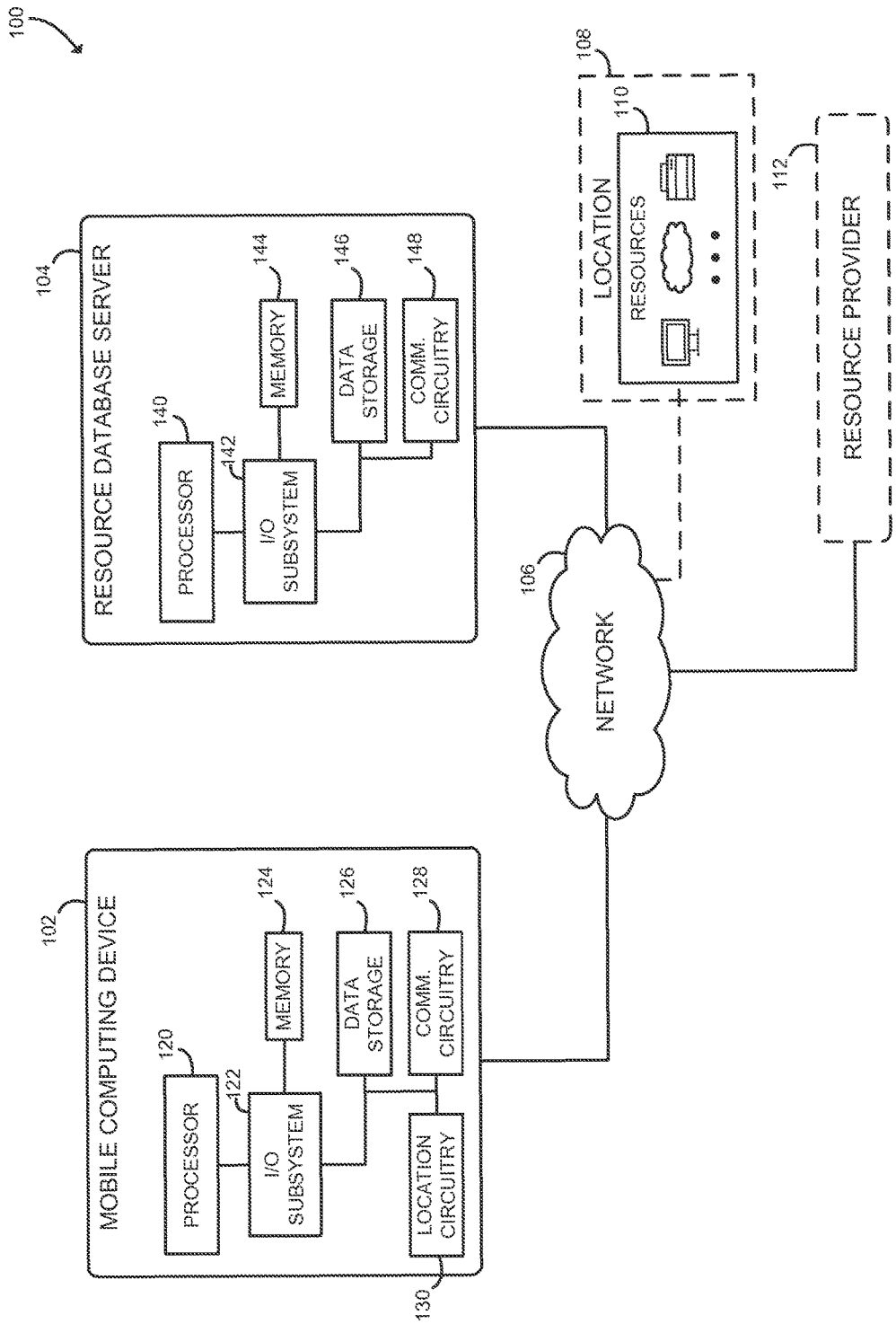
FIG. 1 is a simplified block diagram of at least one embodiment of a system for resource management for a mobile computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g. computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for resource management includes a mobile computing device 102 and a resource database server 104 in communication with each other over a network 106. The system 100 also includes one or more resources 110 located at a location 108 that may also be capable of communication over the network 106. The system 100 may further include a resource provider 112 coupled to the network 106. In use, as discussed in more detail below, the mobile computing device 102 (or, in some embodiments, the resource database server 104) determines a future context and communicates that future context to the resource database server 104. The resource database server 104 determines resources 110 that will be available to the mobile computing device 102 at a location 108 defined by the future context, allowing the mobile computing device 102 to configure itself to use those resources 110 prior to, or in anticipation of, arriving at the location 108. The illustrative system 100 includes a single location 108 containing resources 110; however, the system 100 may manage resources 110 for any number of locations 108.

The disclosed technologies allow the mobile computing device 102 to adapt to new contexts and locations seamlessly. That is, in the illustrative embodiments, a user of the mobile computing device 102 is not required to manually pre-configure the mobile computing device 102 for new locations, which pre-configuration may not even be possible in some circumstances. Additionally, once at the new location, the user may access available resources 110 quickly and easily, without wasting time configuring the mobile computing device 102. Further, such seamless and easy configuration may allow a resource provider 112 to provide resources 110 to a larger number of users.

The mobile computing device 102 may be embodied as any type of device for performing the functions described herein. For example, the mobile computing device 102 may be embodied as, without limitation, a computer, a smart phone, a tablet computer, a laptop computer, a notebook computer, a mobile computing device, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to plan for future device context. As shown in FIG. 1, the illustrative mobile computing device 102 includes a processor 120, an input/output subsystem 122, a memory 124, a data storage device 126, and a communication circuit 128. Of course, the mobile computing device 102 may include other or additional components, such as those commonly found in a notebook computer (e.g. various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 102. For example, the I/O subsystem 122 may be embodied as, or otherwise include, memory controller hubs, input/output control hubs, firmware devices, communication links (i.e. point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store information relating to the context of the mobile computing device 102, such as a user calendar and location information. The data storage device 126 may also store software or configuration information for using the resources 110.

The communication circuit 128 of the mobile computing device 102 may be embodied as any communication circuit, device, or collection thereof, capable of enabling communications between the mobile computing device 102, the resource database server 104, and/or other remote devices. The communication circuit 128 may be configured to use any one or more communication technology (e.g. wireless or wired communications) and associated protocols (e.g. Ethernet, Bluetooth®, Wi-Fi®, WiMAX, etc.) to effect such communication.

In the illustrative embodiment, the mobile computing device 102 includes location circuitry 130. The location circuitry 130 may be embodied as any type of circuit capable of determining the precise or approximate position of the mobile computing device 102. For example, the location circuitry 130 may be embodied as a global positioning system (GPS) receiver, capable of determining the precise coordinates of the mobile computing device 102. In other embodiments, the location circuitry 130 may triangulate the position of the mobile computing device 102 using distances or angles to cellular network towers with known positions, provided by the communication circuit 128. In other embodiments, the location circuitry 130 may determine the approximate position of the mobile computing device 102 based on association to wireless networks with known positions, using the communication circuit 128.

As discussed in more detail below, the mobile computing device 102 is configured to transmit and receive data with the other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications between the mobile computing device 102 and the other devices of the system 100).

The resource database server 104 may be embodied as any type of server computing device, or collection of devices, capable of performing the functions described herein. As such, the resource database server 104 may be embodied as a single server computing device or a collection of servers and associated devices. For example, in some embodiments, the resource database server 104 is embodied as a cloud database service to perform the functions described herein. In such embodiments, the resource database server 104 may be embodied as a "virtual server" formed from multiple computing devices distributed across the network 106 and operating in a public or private cloud. Accordingly, although the resource database server 104 is illustrated in FIG. 1 and described below as embodied as a single server computing device, it should be appreciated that the resource database server 104 may be embodied as multiple devices cooperating together to facilitate the functionality described below. Illustratively, the resource database server 104 includes a processor 140, an I/O subsystem 142, a memory 144, a data storage 146, a communication circuitry 148, and/or other components and devices commonly found in a computer server or similar computing device. Those individual components of the resource database server 104 may be similar to the corresponding components of the mobile computing device 102, the description of which is applicable to the corresponding components the resource database server 104 and is not repeated herein so as not to obscure the present disclosure.

The location 108 may be embodied as any physical location, and of any scale. For example, the location 108 may be embodied as a room, a building, a campus, or a city. In some embodiments, the location 108 may be defined by particular geographical coordinates. As described above, the location 108 includes one or more resources 110, which may be embodied as any computing resource usable by the mobile computing device 102. The resources 110 may include displays, projectors, printers, network connectors, and other computing resources. For example, one resource 110 may be embodied as an Intel® Wireless Display ("WiDi")-enabled display.

The resource provider 112 is configured to provide information on the resources 110 to the resource database server 104, as discussed in more detail below. The resource provider 112 may be controlled or operated by the person or entity responsible for a particular resource 110, such as the resource owner, information technology department, resource manufacturer, etc. As such, the resource provider 112 may include components and features similar to the mobile computing device 102 and the resource database server 104, such as a processor, I/O subsystem, memory, data storage, communication circuitry, and various peripheral devices, which are not illustrated in FIG. 1 for clarity of the present description. Further, although the illustrative system 100 of FIG. 1 includes one resource provider 112, it should be understood that any number of resource providers 112 may interact with the system 100. In such embodiments, each resource provider 112 may be responsible for a subset of the resources 110.

Figure 2:
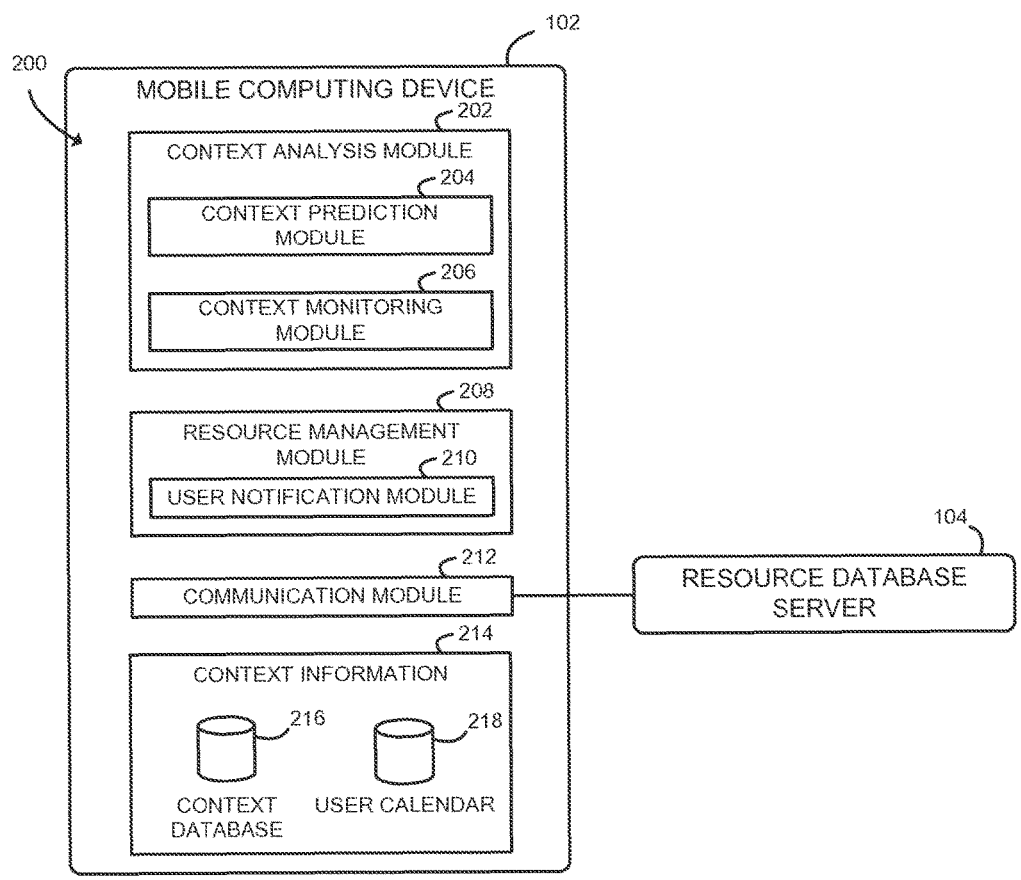
FIG. 2 is a simplified block diagram of at least one embodiment of an environment of the mobile computing device of the system of FIG. 1.

Referring now to FIG. 2, in one embodiment, the mobile computing device 102 establishes an environment 200 during operation. The illustrative embodiment 200 includes a context analysis module 202, a resource management module 208, a communication module 212, and context information 214. The various modules of the environment 200 may be embodied as hardware, firmware, software, or a combination thereof.

The context analysis module 202 is configured to predict the future context and monitor the current context of the mobile computing device 102. As described in more detail below, the context of the illustrative mobile computing device 102 defines the physical location of the mobile computing device 102, and may define other contextual aspects of the mobile computing device 102. In some embodiments, those functions may be performed by sub-modules, for example, by a context prediction module 204 and a context monitoring module 206.

The resource management module 208 is configured to prepare the mobile computing device 102 to use resources 110 at the location 108 defined by the future context, and to enable use of the resources 110 at the future context. The resource management module 208 may configure settings on the mobile computing device 102 or download and configure additional software (e.g., device drivers, applications, etc.) required to use the resources 110. In some embodiments, the resource management module 208 may notify the user of the mobile computing device 102 of the resources 110. In some embodiments, those functions may be performed by sub-modules, for example, by a user notification module 210.

The communication module 212 is configured to communicate with the resource database server 104. The communication module 212 sends requests for resource information to the resource database server 104. Those requests may include information on the future context predicted by the context analysis module 202. The communication module 212 receives resource information from the resource database server 104 in response. The resource information is used by the resource management module 208.

The context information 214 stores information relevant to the context of the mobile computing device 102, including information on the current and past context of the mobile computing device 102 and information on the user calendar. As described in detail below, the context analysis module 202 may use the context information 214 to predict the future context of the mobile computing device 102. Such information may be stored in one or more databases, for example, in a context database 216 and a user calendar 218.

Figure 3:
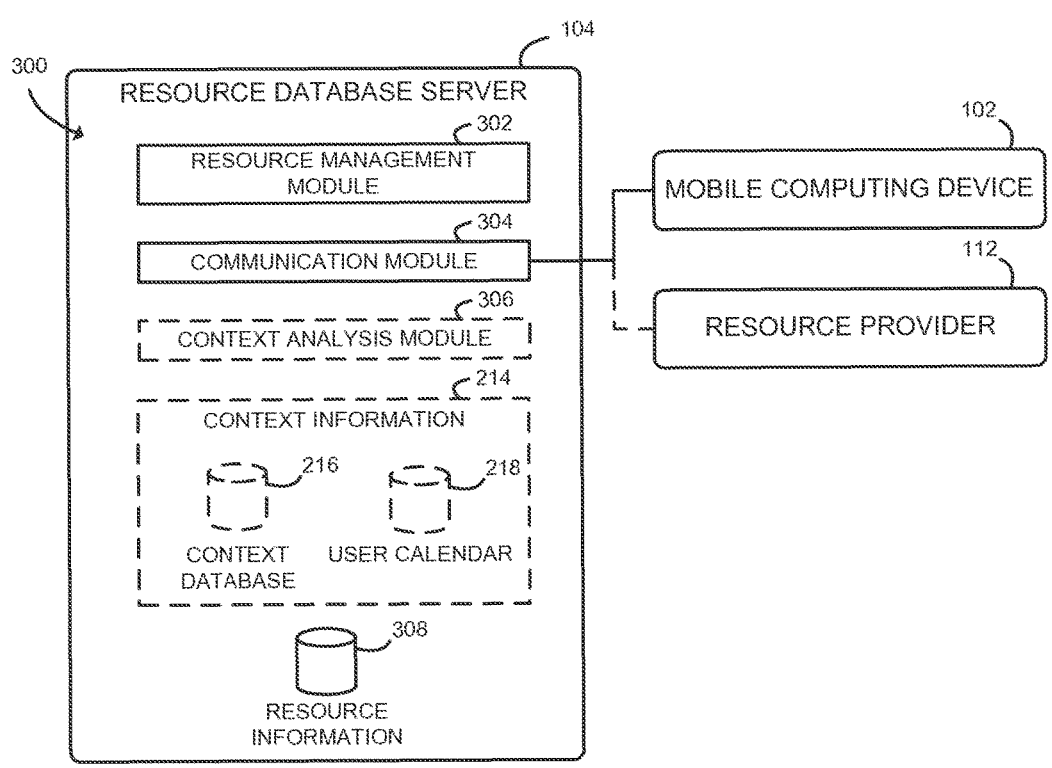
FIG. 3 is a simplified block diagram of at least one embodiment of an environment of a resource database server of the system of FIG. 1.

Referring now to FIG. 3, in one embodiment, the resource database server 104 establishes an environment 300 during operation. The illustrative embodiment 300 includes a resource management module 302, a communication module 304, and resource database 308. In some embodiments, the environment 300 may also include a context analysis module 306 and the user calendar 218. The various modules of the environment 300 may be embodied as hardware, firmware, software, or a combination thereof.

The resource management module 302 is configured to determine resource information associated with a future context of the mobile computing device 102. The resource information describes resources 110 located at a location 108 defined by the current context of the mobile computing device 102. The resource management module 302 may provide additional software, such as device drivers and/or applications, required to use the resources 110 to the mobile computing device 102.

The communication module 304 is configured to receive requests from the mobile computing device 102 for resource information and to send requested resource information in response. In some embodiments, the communication module 304 may receive resource information from one or more resource providers 112.

In some embodiments, the resource database server 104 may be configured to determine the future context of the mobile computing device 102 based on context information received from the mobile computing device 102. In such embodiments, the environment 300 of the resource database server 104 may include, in addition to the context analysis module 306, the context information 214. As discussed above, the context information 214 includes the context database 216 and the user calendar 218. Such context information 214 may be used by the context analysis module 306 as described above with respect to the context analysis module 202.

The resource database 308 describes all resources 110 at locations 108 known to the resource database server 104. The resource management module 302 uses the resource database 308 to respond to requests from the mobile computing device 102. Part or all of the information of the resource database 308 may be provided by one or more resource providers 112. As discussed in more detail below, the resource information may include any type of information usable by the mobile computing device 102 to configure itself to communicate with the resources 110.

Figure 4:
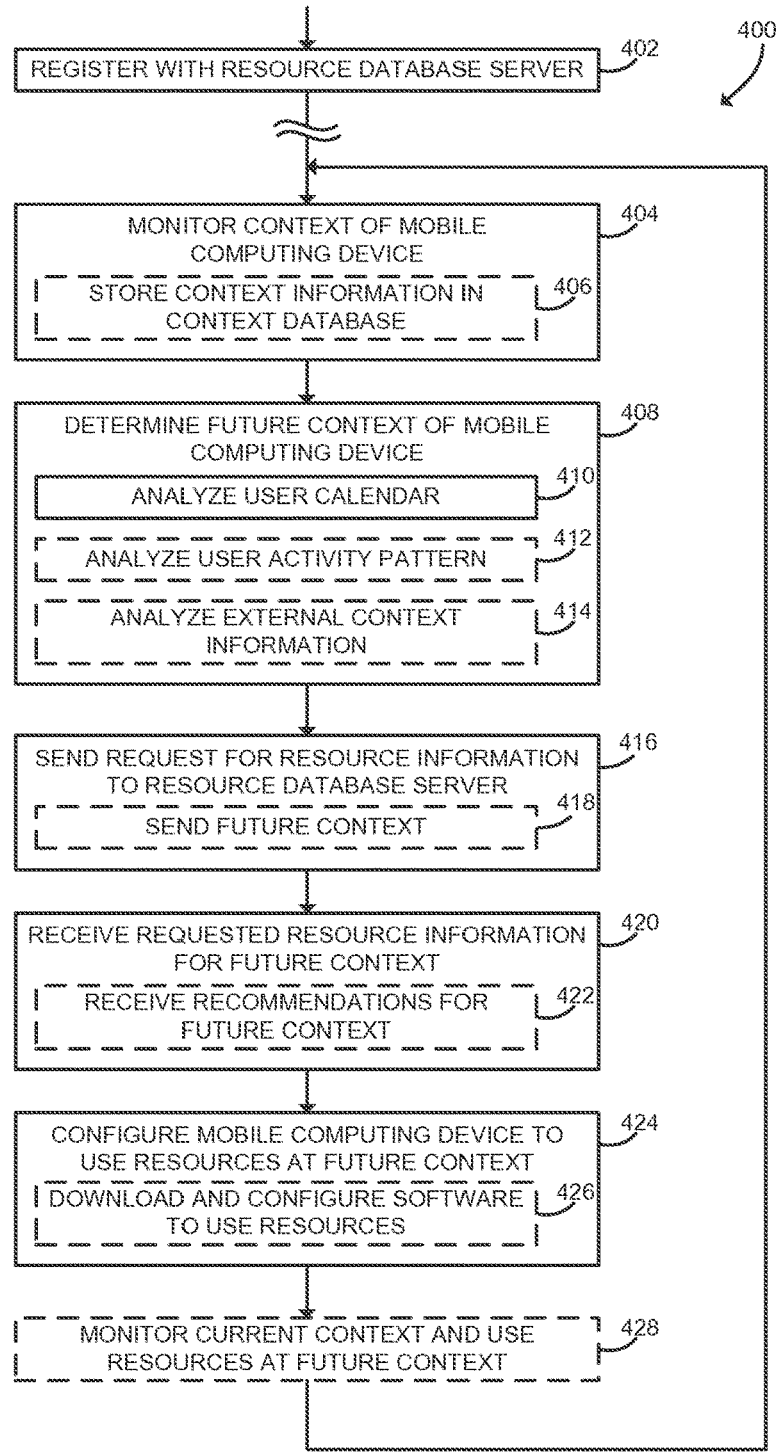
FIG. 4 is a simplified flow diagram of at least one embodiment of a method for resource management that may be executed by the mobile computing device of FIGS. 1 and 2.

Referring now to FIG. 4, in use, the mobile computing device 102 may execute a method 400 for resource management. The method 400 begins with block 402, in which the mobile computing device 102 registers with the resource database server 104. Such registration may include creating a user account on the resource database server 104 and associating the mobile computing device 102 with the user account. As part of the registration process, the user of the mobile computing device 102 may choose to make personal information, such as calendar, contact, or location information, available to the resource database server 104. The user may also elect particular context domains for use with the method 400, for example electing to make work-specific context information available. Registration may be performed ahead of time.

After some time, in block 404, the mobile computing device 102 monitors its current context. As an aspect of the current context, the mobile computing device 102 may monitor its current location. Of course, the mobile computing device 102 may monitor additional or other contextual aspects of the mobile computing device and/or user of the computing device including, but not limited to, power state of the mobile computing device 102, use data related to software applications executed on the mobile computing device 102, movement of the mobile computing device 102, activities of the user, local weather, events located near the current location of the device 102 and/or user, and/or other contextual information related to the mobile computing device 102 and/or the user of the mobile computing device 102. In some embodiments, in block 406 the mobile computing device 102 may store the current context information in the context database 216 for future reference. The context database 216 may be used to derive patterns of activity for the mobile computing device 102. For example, the mobile computing device 102 may store in the context database 216 the current location, a business located at or near the current location, or the number of times the mobile computing device 102 has been located at the current location.

In block 408, the mobile computing device 102 determines a future context of the mobile computing device 102, including a future location 108 of the mobile computing device 102. In some embodiments, the timeframe of the future context (e.g. next day, next week) may be specified by the user. To determine the future context, the mobile computing device 102 may access and analyze any type of data from which an aspect of the future context of the mobile computing device 102 may be determined or otherwise inferred. For example, in block 410, the mobile computing device 102 analyzes the user calendar 218 to predict the future context. Upcoming calendar events in the user calendar 218 may include information relevant to a location at which the user is expected to visit in the future timeframe, such as room number, address, geographical coordinates, or the like. Thus the mobile computing device 102 may determine its likely future location 108 using information stored in the calendar event describing the event location. In other embodiments, the mobile computing device 102 may determine the future location 108 based on semantic analysis of calendar events. For example, the user calendar 218 may include airline flight information, which may be analyzed to determine likely physical location. All of these determinations infer the device location by assuming that the user will take the mobile computing device 102 along for the schedule event.

In some embodiments, in block 412, the mobile computing device 102 may analyze a historical activity pattern of the user to predict the future context. As described above, the mobile computing device 102 may record or otherwise track device context in the context database 216. The mobile computing device 102 may analyze the context database 216 and the user calendar 218 to determine the historical activity pattern of the user. For example, the context database 216 may indicate that a business traveler frequently visits a particular facility located in a particular city. When the user calendar indicates 214 future travel to that particular city, the mobile computing device 102 may predict the future context to include that particular facility based on the user's activity pattern. As another example, the context database 216 may indicate that the user frequently visits locations of a national restaurant chain. When predicting travel to a new city, the mobile computing device 102 may predict the future context to include locations of the national restaurant chain based on the user's activity pattern.

Additionally, in some embodiments, in block 414, the mobile computing device 102 may determine the future context based on external context information. For example, the mobile computing device 102 may search a public or organizational event calendar to determine the likely future location of the user. In some embodiments, the mobile computing device 102 may search the Internet for information relating to the likely future location of the user. For example, the external context information may indicate the date and location of a national conference relating to the user's work. The mobile computing device 102 may determine that the user—and thus the mobile computing device 102—may attend the conference, thereby determining the location of the future context.

In block 416, the mobile computing device 102 sends a request for resource information to the resource database server 104. In some embodiments, in block 408 the request may include information on the predicted future context. Such future context information may be embodied as information describing a particular physical location 108 or a group of physical locations 108. In some embodiments, the future context information may include context information from which physical location information may be derived by the resource database server 104.

In block 420, the mobile computing device 102 receives the requested resource information from the resource database server 104. The requested resource information describes resources 110 at the location 108 defined by the predicted future context. The resource information may describe such resources 110 using a unique identifier such as a device name, network name, network address, serial number, globally unique identifier (GUID), or the like. Additionally, the resource information may include any type of information usable by the mobile computing device 102 to configure itself to communicate, or otherwise interact, with one or more of the resources 110 located at the location 108. For example, the resource information may identify device settings, communication protocols, resource identity information, device driver information, passwords, security information, and/or any other type of information useful in establishing interoperability between the mobile computing device 102 and the resource(s) 110.

In block 422, in some embodiments the mobile computing device 102 may also receive one or more recommendations associated with the location 108 defined by the future context. In some embodiments, the recommendations may include a media content recommendation such as a video, song, e-book, or periodical. For example, given a future context involving an airplane trip, the recommendation may include one or more movies according to the scheduled duration of the trip. In some embodiments, the recommendations may include travel information recommendations such as weather information, traffic information, or flight status information. For example, given a future context including a particular city, the recommendation may include the weather forecast for that city. In some embodiments, the mobile computing device 102 may notify the user of any recommendations received from the resource database server, for example through a user interface alert.

In block 424, the mobile computing device 102 configures itself to use the resources 110 at the location 108 defined by the future context. For example, the mobile computing device 102 may pre-configure network settings to use a network connection available at the location 108 defined by the future context. Similarly, the mobile computing device 102 may pre-configure printer settings to use a printer at the location 108 or display settings to use a WiDi display device at the location 108. In some embodiments, the mobile computing device 102 may configure itself to display media content using resources 110 available at the location 108. For example, the mobile computing device 102 may download media content or negotiate digital access rights for media content to be accessed with a media player device located at the location 108. In some embodiments, the mobile computing device 102 may configure itself to use the resources 110 automatically, that is configure itself without direction from the user. In some embodiments, in block 426, the mobile computing device 102 may download and configure software to use the resources 110. For example, the mobile computing device 102 may download and configure appropriate device drivers to use printers and displays at the location 108. The mobile computing device 102 may download such software directly from the resource database server 104 or from a third-party source such as the device manufacturer.

In some embodiments, in block 428 the mobile computing device 102 monitors its current context and uses the resources 110 when located at the location 108 defined by the future context. The method of block 428 is described in detail in connection with FIG. 5, below. After completing block 428, the method 400 loops back to block 404 to continue monitoring the context of the mobile computing device 102 and determining the future context. Although illustrated as executing sequentially with the other blocks of method 400, in some embodiments the method of block 428 may be executed in any order, including in parallel. For example, the mobile computing device 102 may monitor the current context and enable resources at the current location while simultaneously determining the future context.

Figure 5:
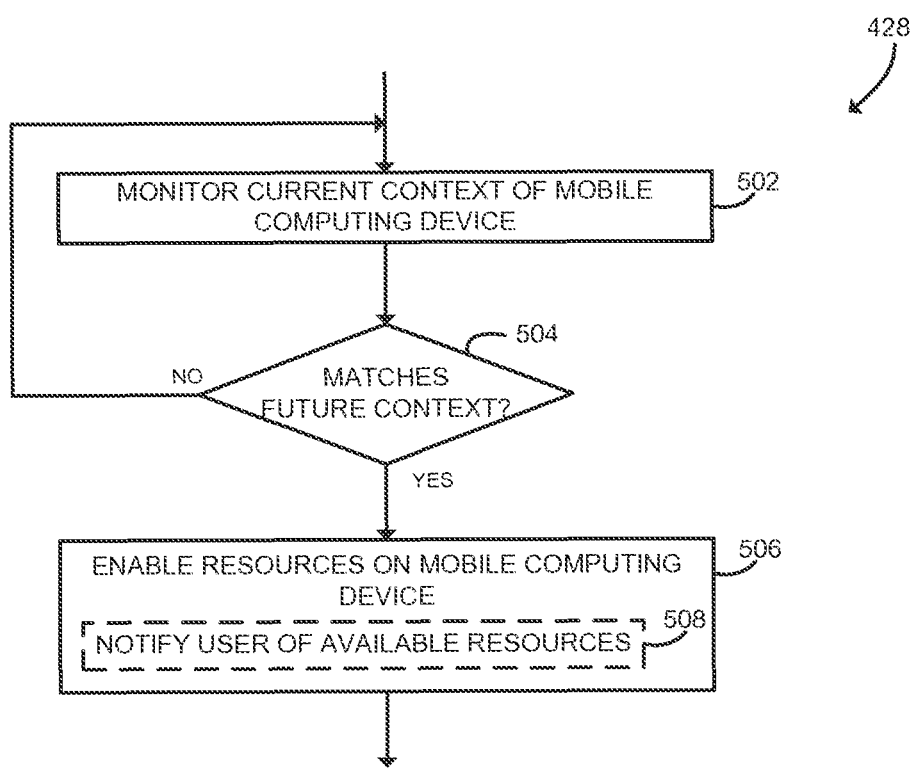
FIG. 5 is a simplified flow diagram of at least one embodiment of a method for monitoring current context that may be executed by the mobile computing device of FIGS. 1 and 2.

Referring now to FIG. 5, in use, the mobile computing device 102 may execute the method of block 428 for monitoring the current context and using the resources 110. The method of block 428 begins with block 502, in which the mobile computing device 102 monitors the context of the mobile computing device 102. In some embodiments, the mobile computing device 102 uses the location circuitry 130 to determine the current location of the mobile computing device 102. In block 504, the mobile computing device 102 determines whether the location of the current context matches the location 108 defined by the future context. The mobile computing device 102 may determine whether current location of the mobile computing device 102 is within a threshold distance of the location 108 defined by the future context. If the current location does not match the location 108 defined by the future context, the method of block 428 loops back to block 502 to continue monitoring current context. If the current location matches the location 108 defined by the future context, the method of block 428 advances to block 506.

In block 506, the mobile computing device 102 enables for use the resources 110 at the location 108 defined by the future context. Of course, at this point the current location coincides with the location 108 defined by the future context. To enable the resources 110, the mobile computing device 102 may activate support software for the resources 110), open network connections, forward display output, or otherwise make the resources 110 available to the user using the resource information obtain in block 420 of method 400.

In some embodiments, in block 508 the mobile computing device 102 may notify the user of the availability of the resources 110 at the current context. For example, the mobile computing device 102 may present the user with a list of printers, displays, and network connections available at the current location. In some embodiments, the notification may allow the user to selectively activate available resources 110. After completion of block 506, the method of block 428 is completed.

Figure 6:
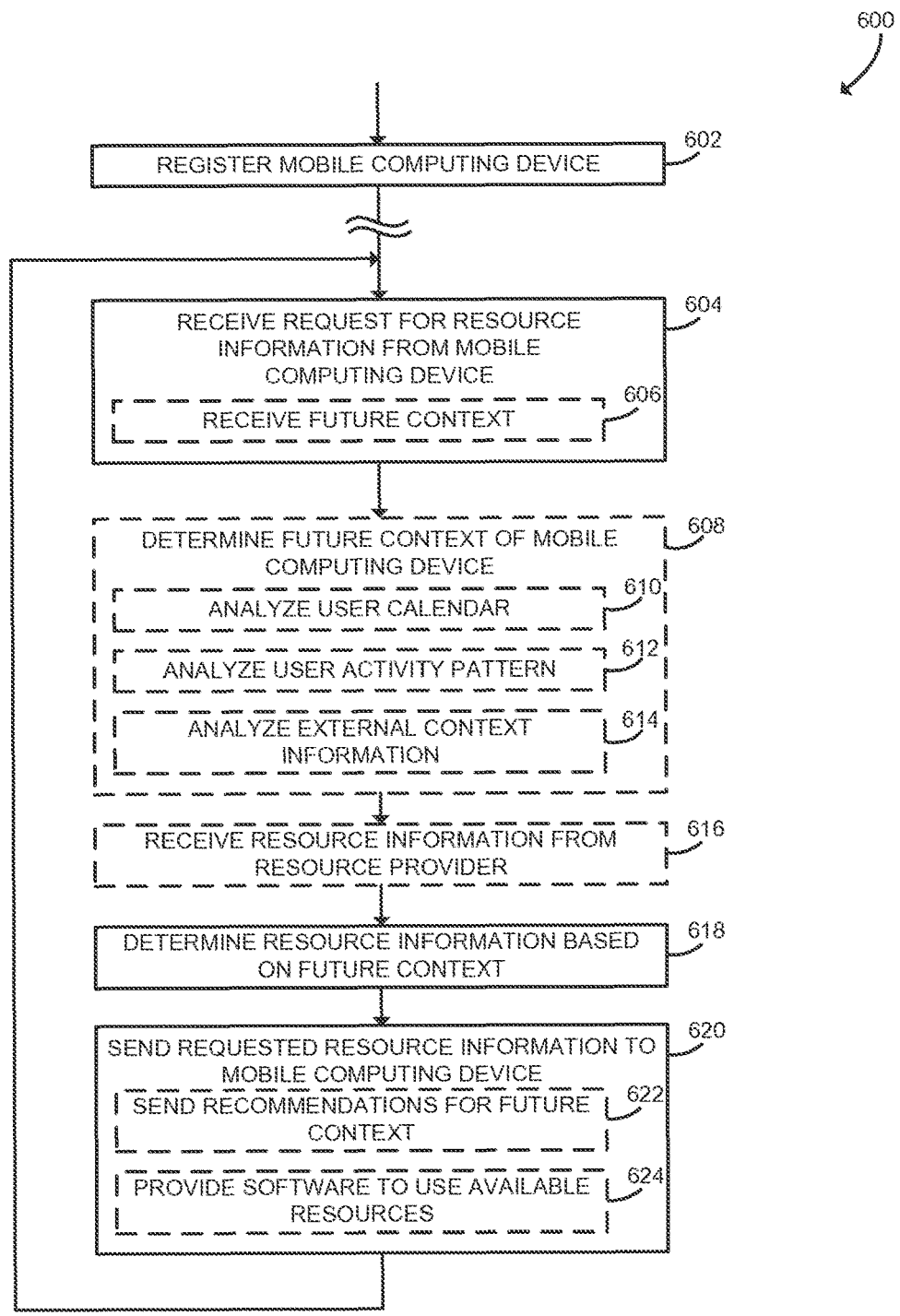
FIG. 6 is a simplified flow diagram of at least one embodiment of a method for supporting resource management that may be executed by the resource database server of FIGS. 1 and 3.

Referring now to FIG. 6, in use, the resource database server 104 may execute a method 600 for supporting resource management for the mobile computing device 102. The method 600 begins with block 602, in which the resource database server 104 registers a mobile computing device 102. Such registration may include creating a user account on the resource database server 104 and associating the mobile computing device 102 with the user account. As part of the registration process, the user of the mobile computing device 102 may choose to make personal information, such as calendar, contact, or location information, available to the resource database server 104. The user may also elect particular context domains for use with the method 600, for example electing work-specific context information. Registration may be performed ahead of time.

In block 604, the resource database server 104 receives a request for resource information from the mobile computing device 102. In some embodiments, in block 606, the request may include information on a future context of the mobile computing device 102. Such future context information may be embodied as information describing a particular physical location 108 or a group of physical locations 108. In some embodiments, the future context information may include context information from which physical location information may be derived by the resource database server 104.

In some embodiments, in block 608, the resource database server 104 may determine the future context of the mobile computing device 102. For example, when the request for information does not include future context information, the resource database server 104 may predict the future context information. In some embodiments, the timeframe of the future context (e.g. next day, next week) may be specified by the user of the mobile computing device 102. In some embodiments, in block 610, the resource database server 104 may analyze the user calendar 218 to determine the future context. The user calendar 218 may be stored on the resource database server 104, the mobile computing device 102, or on a different device, such as a cloud data service. As described above, upcoming calendar events in the user calendar 218 may include information relevant to location, such as room number, address, geographical coordinates, or the like. Thus the resource database server 104 may determine the likely future location 108 of the mobile computing device 102 using information stored in the calendar event describing the event location. In other embodiments, the resource database server 104 may determine the future location 108 based on semantic analysis of calendar events. For example, the user calendar 218 may include airline flight information, which may be analyzed to determine likely physical location. All of these determinations infer the device location by assuming that the user will take the mobile computing device 102 along for the schedule event.

In some embodiments, in block 612, the resource database server 104 may analyze a historical activity pattern of the user to predict the future context. The resource database server 104 may analyze the context database 216 and the user calendar 218 to determine the historical activity pattern of the user. For example, as described above, the context database 216 may indicate that a business traveler frequently visits a particular facility located in a particular city. When the user calendar 218 indicates future travel to that particular city, the resource database server 104 may predict the future context to include that particular facility based on the user's activity pattern. As another example, the context database 216 may indicate that the user frequently visits locations of a national restaurant chain. When predicting travel to a new city, the resource database server 104 may predict the future context to include locations of the national restaurant chain based on the user's activity pattern.

In some embodiments, in block 614, the resource database server 104 may determine the future context based on external context information. For example, the resource database server 104 may search a public or organizational event calendar to determine the likely future location of the user. In some embodiments, the resource database server 104 may search the Internet for information relating to the likely future location of the user. For example, as described above, the external context information may indicate the date and location of a national conference relating to the user's work. The resource database server 104 may determine that the user—and thus the mobile computing device 102—may attend the conference, thereby determining the location of the future context.

In some embodiments, in block 616, the resource database server 104 receives resource information from a resource provider 112. As described above, the resource provider 112 may be controlled by the owner of the resources 110, and may provide information to allow travelers and others to use the resources 110. For example, the owner of a coffeeshop providing wireless Internet access may provide information on network connections to the resource database server 104 in order to encourage visitors. Although illustrated in FIG. 6 as executing sequentially as part of the method 600, the resource database server 104 may receive the resource information at other times, including in a parallel process. Resource information may be stored in the resource database 308 for later retrieval or may be retrieved from the resource provider 112 as needed.

In block 618, the resource database server 104 determines resource information based on the future context of the mobile computing device 102. The resource database server 104 may search the resource database 308 for all resources 110 located at the location 108 defined by the future context. For example, the resource database server 104 may search for resources 110 located within a threshold distance from the predicted future location 108 of the mobile computing device 102. As described above, the resource database 308 may include resource information provided by one or more resource providers 112 as well as information provided directly by the resource database server 104.

In block 620, the resource database server 104 sends the requested resource information to the mobile computing device 102. As described above, the resource information describes the computing resources 110 located at the location 108 and may include any type of information usable by the mobile computing device 102 to configure the mobile computing device 102 for interoperability with the resources 110. The resource information may describe the resources 110 using a unique identifier such as a device name, network name, network address, serial number, globally unique identifier (GUID), or the like.

In block 622, in some embodiments the resource database server 104 may send a recommendation associated with the location 108 defined by the future context to the mobile computing device 102. The resource database server 104 may determine the recommendation by analyzing external data sources based on the future context. As described above, in some embodiments, the recommendations may include a media content recommendation such as a video, song, e-book, or periodical. For example, given a future context involving an airplane trip, the recommendation may include one or more movies according to the scheduled duration of the trip. In some embodiments, the recommendations may include travel information recommendations such as weather information, traffic information, or flight status information. For example, given a future context including a particular city, the recommendation may include the weather forecast for that city.

In block 624, in some embodiments the resource database server 104 may provide software to the mobile computing device 102 to use a resource 110 at the location 108 defined by the future context. As described above, the resource database server 104 may send appropriate device drivers for the printers and displays located at the location 108. After completing block 620, the method 600 loops back to block 604 to continue receiving requests from the mobile computing device 102.

EXAMPLES

Illustrative examples of the technologies disclosed herein are provided below. An embodiment of the technologies may include any one or more, and any combination of, the examples described below.

Example 1 includes a mobile computing device for resource management based on contextual planning comprising a context analysis module to determine a future context of the mobile computing device; a communication module to (i) send a request to a resource database server to request resource information associated with a location defined by the future context and (ii) receive the requested resource information; and a resource management module to configure, using the received resource information, the mobile computing device to use a resource located at the location.

Example 2 includes the subject matter of Example 1, and wherein the communication module comprises a communication module to send the request without direction from a user of the mobile computing device; and the resource management module comprises a resource management module to configure the mobile computing device without direction from the user.

Example 3 includes the subject matter of any of Examples 1 and 2, and wherein the context analysis module comprises a context analysis module to analyze a user calendar to predict the future context of the mobile computing device.

Example 4 includes the subject matter of any of Examples 1-3, and wherein the context analysis module further comprises a context monitoring module to monitor a context of the mobile computing device to determine a historical activity pattern of a user of the mobile computing device; and a context analysis module to analyze the historical activity pattern to predict the future context of the mobile computing device.

Example 5 includes the subject matter of any of Examples 1-4, and wherein the context analysis module comprises a context analysis module to analyze a data source external to the mobile computing device to predict the future context of the mobile computing device.

Example 6 includes the subject matter of any of Examples 1-5, and wherein the resource comprises a computing resource located at the location defined by the future context.

Example 7 includes the subject matter of any of Examples 1-6, and wherein the computing resource comprises a printer located at the location defined by the future context.

Example 8 includes the subject matter of any of Examples 1-7, and wherein the computing resource comprises a display located at the location defined by the future context.

Example 9 includes the subject matter of any of Examples 1-8, and wherein the computing resource comprises a network connection of the location defined by the future context.

Example 10 includes the subject matter of any of Examples 1-9, and wherein the resource management module comprises a resource management module to download software to use the resource located at the location.

Example 11 includes the subject matter of any of Examples 1-10, and wherein the software to use the resource comprises a device driver for the resource.

Example 12 includes the subject matter of any of Examples 1-11, and wherein the context analysis module further comprises a context monitoring module to monitor a current context of the mobile computing device, and determine whether a location defined by the current context matches the location defined by the future context; and the resource management module comprises a resource management module to enable the resource in response to determining the location defined by the current context matches the location defined by the future context.

Example 13 includes the subject matter of any of Examples 1-12, and further including a user notification module to notify a user of the mobile computing device of the availability of the resource in response to determining the location defined by the current context matches the location defined by the future context.

Example 14 includes the subject matter of any of Examples 1-13, and further including a user notification module, wherein the communication module comprises a communication module to receive a recommendation associated with the location from the resource database server; and the user notification module comprises a user notification module to notify a user of the mobile computing device of the recommendation.

Example 15 includes the subject matter of any of Examples 1-14, and wherein the recommendation comprises a media content recommendation.

Example 16 includes the subject matter of any of Examples 1-15, and wherein the media content recommendation comprises a recommendation for one of a video, song, e-book, or periodical.

Example 17 includes the subject matter of any of Examples 1-16, and wherein the recommendation comprises a travel information recommendation.

Example 18 includes the subject matter of any of Examples 1-17, and wherein the travel information recommendation comprises one of weather information, traffic information, or flight status information.

Example 19 includes a resource database server to support resource management on a mobile computing device, the resource database server comprising a communication module to receive a request for resource information from the mobile computing device; and a resource management module to determine resource information associated with a location defined by a future context of the mobile computing device in response to receiving the request; wherein the communication module is to send the requested resource information to the mobile computing device.

Example 20 includes the subject matter of Example 19, and wherein the communication module comprises a communication module to receive the location defined by the future context from the mobile computing device.

Example 21 includes the subject matter of any of Examples 19 and 20, and further including a context analysis module to determine the future context of the mobile computing device in response to receiving the request for resource information.

Example 22 includes the subject matter of any of Examples 19-21, and wherein the context analysis module comprises a context analysis module to analyze a user calendar stored on the resource database server to predict the future context of the mobile computing device.

Example 23 includes the subject matter of any of Examples 19-22, and wherein the context analysis module comprises a context analysis module to analyze a historical activity pattern of a user of the mobile computing device stored on the resource database server to predict the future context of the mobile computing device.

Example 24 includes the subject matter of any of Examples 19-23, and wherein the context analysis module comprises a context analysis module to analyze a data source external to the resource database server to predict the future context of the mobile computing device.

Example 25 includes the subject matter of any of Examples 19-24, and wherein the communication module comprises a communication module to receive the resource information from a resource provider.

Example 26 includes the subject matter of any of Examples 19-25, and wherein the resource information comprises information describing a computing resource located at the location defined by the future context.

Example 27 includes the subject matter of any of Examples 19-26, and wherein the computing resource comprises a printer located at the location defined by the future context.

Example 28 includes the subject matter of any of Examples 19-27, and wherein the computing resource comprises a display located at the location defined by the future context.

Example 29 includes the subject matter of any of Examples 19-28, and wherein the computing resource comprises a network connection of the location defined by the future context.

Example 30 includes the subject matter of any of Examples 19-29, and wherein the resource management module comprises a resource management module to determine a recommendation associated with the location in response to receiving the request; and the communication module comprises a communication module to send the recommendation to the mobile computing device.

Example 31 includes the subject matter of any of Examples 19-30, and wherein the recommendation comprises a media content recommendation.

Example 32 includes the subject matter of any of Examples 19-31, and wherein the media content recommendation comprises a recommendation for one of a video, song, e-book, or periodical.

Example 33 includes the subject matter of any of Examples 19-32, and wherein the recommendation comprises a travel information recommendation.

Example 34 includes the subject matter of any of Examples 19-33, and wherein the travel information recommendation comprises one of weather information, traffic information, or flight status information.

Example 35 includes the subject matter of any of Examples 19-34, and wherein the resource management module comprises a resource management module to send software for using a resource located at the location to the mobile computing device.

Example 36 includes the subject matter of any of Examples 19-35, and wherein the software for using the resource comprises a device driver for the resource.

Example 37 includes a method for resource management on a mobile computing device comprising determining, on the mobile computing device, a future context of the mobile computing device; sending a request from the mobile computing device to a resource database server to request resource information associated with a location defined by the future context; receiving, on the mobile computing device, the requested resource information; and configuring, using the received resource information, the mobile computing device to use a resource located at the location.

Example 38 includes the subject matter of Example 37, and wherein sending the request and configuring the mobile computing device comprises sending the request and configuring the mobile computing device without direction from a user of the mobile computing device.

Example 39 includes the subject matter of any of Examples 37 and 38, and wherein determining the future context comprises analyzing a user calendar to predict the future context of the mobile computing device.

Example 40 includes the subject matter of any of Examples 37-39, and further including monitoring a context of the mobile computing device to determine a historical activity pattern of a user of the mobile computing device, wherein determining the future context comprises analyzing the historical activity pattern to predict the future context of the mobile computing device.

Example 41 includes the subject matter of any of Examples 37-40, and wherein determining the future context comprises analyzing a data source external to the mobile computing device to predict the future context of the mobile computing device.

Example 42 includes the subject matter of any of Examples 37-41, and wherein receiving the requested resource information comprises receiving information describing a computing resource located at the location defined by the future context.

Example 43 includes the subject matter of any of Examples 37-42, and wherein receiving information describing a computing resource comprises receiving information describing a printer located at the location defined by the future context.

Example 44 includes the subject matter of any of Examples 37-43, and wherein receiving information describing a computing resource comprises receiving information describing a display located at the location defined by the future context.

Example 45 includes the subject matter of any of Examples 37-44, and wherein receiving information describing a computing resource comprises receiving information describing a network connection of the location defined by the future context.

Example 46 includes the subject matter of any of Examples 37-45, and further including downloading, on the mobile computing device, software to use the resource located at the location.

Example 47 includes the subject matter of any of Examples 37-46, and wherein downloading the software comprises downloading a device driver for the resource.

Example 48 includes the subject matter of any of Examples 37-47, and further including monitoring, on the mobile computing device, a current context of the mobile computing device; determining, on the mobile computing device, whether a location defined by the current context matches the location defined by the future context; and enabling the resource in response to determining the location defined by the current context matches the location defined by the future context.

Example 49 includes the subject matter of any of Examples 37-48, and further including notifying a user of the mobile computing device of the availability of the resource in response to determining the location defined by the current context matches the location defined by the future context.

Example 50 includes the subject matter of any of Examples 37-49, and further including receiving, on the mobile computing device, a recommendation associated with the location from the resource database server; and notifying, on the mobile computing device, a user of the mobile computing device of the recommendation.

Example 51 includes the subject matter of any of Examples 37-50, and wherein receiving the recommendation comprises receiving a media content recommendation.

Example 52 includes the subject matter of any of Examples 37-51, and wherein receiving the media content recommendation comprises receiving a recommendation for one of a video, song, e-book, or periodical.

Example 53 includes the subject matter of any of Examples 37-52, and wherein receiving the recommendation comprises receiving a travel information recommendation.

Example 54 includes the subject matter of any of Examples 37-53, and wherein receiving the travel information recommendation comprises receiving one of weather information, traffic information, or flight status information.

Example 55 includes a method for supporting resource management on a mobile computing device comprising receiving, on a resource database server, a request for resource information from the mobile computing device; determining, on the resource database server, resource information associated with a location defined by a future context of the mobile computing device in response to receiving the request; and sending the requested resource information from the resource database server to the mobile computing device.

Example 56 includes the subject matter of Example 55, and wherein receiving the request further comprises receiving the location defined by the future context from the mobile computing device.

Example 57 includes the subject matter of any of Examples 55 and 56, and further including determining, on the resource database server, the future context of the mobile computing device in response to receiving the request for resource information.

Example 58 includes the subject matter of any of Examples 55-57, and wherein determining the future context comprises analyzing a user calendar stored on the resource database server to predict the future context of the mobile computing device.

Example 59 includes the subject matter of any of Examples 55-58, and wherein determining the future context comprises analyzing a historical activity pattern of a user of the mobile computing device stored on the resource database server to predict the future context of the mobile computing device.

Example 60 includes the subject matter of any of Examples 55-59, and wherein determining the future context comprises analyzing a data source external to the resource database server to predict the future context of the mobile computing device.

Example 61 includes the subject matter of any of Examples 55-60, and further including receiving the resource information from a resource provider.

Example 62 includes the subject matter of any of Examples 55-61, and wherein determining the resource information comprises determining information describing a computing resource located at the location defined by the future context.

Example 63 includes the subject matter of any of Examples 55-62, and wherein determining information describing a computing resource comprises determining information describing a printer located at the location defined by the future context.

Example 64 includes the subject matter of any of Examples 55-63, and wherein determining information describing a computing resource comprises determining information describing a display located at the location defined by the future context.

Example 65 includes the subject matter of any of Examples 55-64, and wherein determining information describing a computing resource comprises determining information describing a network connection of the location defined by the future context.

Example 66 includes the subject matter of any of Examples 55-65, and further including determining, on the resource database server, a recommendation associated with the location in response to receiving the request; and sending the recommendation from the resource database server to the mobile computing device.

Example 67 includes the subject matter of any of Examples 55-66, and wherein determining the recommendation comprises determining a media content recommendation.

Example 68 includes the subject matter of any of Examples 55-67, and wherein determining the media content recommendation comprises determining a recommendation for one of a video, song, e-book, or periodical.

Example 69 includes the subject matter of any of Examples 55-68, and wherein determining the recommendation comprises determining a travel information recommendation.

Example 70 includes the subject matter of any of Examples 55-69, and wherein determining the travel information recommendation comprises determining one of weather information, traffic information, or flight status information.

Example 71 includes the subject matter of any of Examples 55-70, and further including sending software for using the resource from the resource database server to the mobile computing device.

Example 72 includes the subject matter of any of Examples 55-71, and wherein sending the software comprises sending a device driver for the resource.

Example 73 includes a computing device comprising a processor; and a memory having stored therein a plurality of instructions that when executed by the processor cause the computing device to perform the method of any of Examples 37-72.

Example 74 includes one or more machine readable storage media comprising a plurality of instructions stored thereon that in response to being executed result in a computing device performing the method of any of Examples 37-72.

Example 75 includes a mobile computing device for resource management comprising means for determining, on the mobile computing device, a future context of the mobile computing device; means for sending a request from the mobile computing device to a resource database server to request resource information associated with a location defined by the future context; means for receiving, on the mobile computing device, the requested resource information; and means for configuring, using the received resource information, the mobile computing device to use a resource located at the location.

Example 76 includes the subject matter of Example 75, and wherein the means for sending the request and the means for configuring the mobile computing device comprise means for sending the request and means for configuring the mobile computing device without direction from a user of the mobile computing device.

Example 77 includes the subject matter of any of Examples 75 and 76, and wherein the means for determining the future context comprises means for analyzing a user calendar to predict the future context of the mobile computing device.

Example 78 includes the subject matter of any of Examples 75-77, and further including means for monitoring a context of the mobile computing device to determine a historical activity pattern of a user of the mobile computing device, wherein the means for determining the future context comprises means for analyzing the historical activity pattern to predict the future context of the mobile computing device.

Example 79 includes the subject matter of any of Examples 75-78, and wherein the means for determining the future context comprises means for analyzing a data source external to the mobile computing device to predict the future context of the mobile computing device.

Example 80 includes the subject matter of any of Examples 75-79, and wherein the means for receiving the requested resource information comprises means for receiving information describing a computing resource located at the location defined by the future context.

Example 81 includes the subject matter of any of Examples 75-80, and wherein the means for receiving information describing a computing resource comprises means for receiving information describing a printer located at the location defined by the future context.

Example 82 includes the subject matter of any of Examples 75-81, and wherein the means for receiving information describing a computing resource comprises means for receiving information describing a display located at the location defined by the future context.

Example 83 includes the subject matter of any of Examples 75-82, and wherein the means for receiving information describing a computing resource comprises means for receiving information describing a network connection of the location defined by the future context.

Example 84 includes the subject matter of any of Examples 75-83, and further including means for downloading, on the mobile computing device, software to use the resource located at the location.

Example 85 includes the subject matter of any of Examples 75-84, and wherein the means for downloading the software comprises means for downloading a device driver for the resource.

Example 86 includes the subject matter of any of Examples 75-85, and further including means for monitoring, on the mobile computing device, a current context of the mobile computing device; means for determining, on the mobile computing device, whether a location defined by the current context matches the location defined by the future context; and means for enabling the resource in response to determining the location defined by the current context matches the location defined by the future context.

Example 87 includes the subject matter of any of Examples 75-86, and further including means for notifying a user of the mobile computing device of the availability of the resource in response to determining the location defined by the current context matches the location defined by the future context.

Example 88 includes the subject matter of any of Examples 75-87, and further including means for receiving, on the mobile computing device, a recommendation associated with the location from the resource database server; and means for notifying, on the mobile computing device, a user of the mobile computing device of the recommendation.

Example 89 includes the subject matter of any of Examples 75-88, and wherein the means for receiving the recommendation comprises means for receiving a media content recommendation.

Example 90 includes the subject matter of any of Examples 75-89, and wherein the means for receiving the media content recommendation comprises means for receiving a recommendation for one of a video, song, e-book, or periodical.

Example 91 includes the subject matter of any of Examples 75-90, and wherein the means for receiving the recommendation comprises means for receiving a travel information recommendation.

Example 92 includes the subject matter of any of Examples 75-91, and wherein the means for receiving the travel information recommendation comprises means for receiving one of weather information, traffic information, or flight status information.

Example 93 includes a resource database server for supporting resource management on a mobile computing device, the resource database server comprising means for receiving, on a resource database server, a request for resource information from the mobile computing device; means for determining, on the resource database server, resource information associated with a location defined by a future context of the mobile computing device in response to receiving the request; and means for sending the requested resource information from the resource database server to the mobile computing device.

Example 94 includes the subject matter of Example 93, and wherein the means for receiving the request further comprises means for receiving the location defined by the future context from the mobile computing device.

Example 95 includes the subject matter of any of Examples 93 and 94, and further including means for determining, on the resource database server, the future context of the mobile computing device in response to receiving the request for resource information.

Example 96 includes the subject matter of any of Examples 93-95, and wherein the means for determining the future context comprises means for analyzing a user calendar stored on the resource database server to predict the future context of the mobile computing device.

Example 97 includes the subject matter of any of Examples 93-96, and wherein the means for determining the future context comprises analyzing a historical activity pattern of a user of the mobile computing device stored on the resource database server to predict the future context of the mobile computing device.

Example 98 includes the subject matter of any of Examples 93-97, and wherein the means for determining the future context comprises means for analyzing a data source external to the resource database server to predict the future context of the mobile computing device.

Example 99 includes the subject matter of any of Examples 93-98, and further including means for receiving the resource information from a resource provider.

Example 100 includes the subject matter of any of Examples 93-99, and wherein the means for determining the resource information comprises means for determining information describing a computing resource located at the location defined by the future context.

Example 101 includes the subject matter of any of Examples 93-100, and wherein the means for determining information describing a computing resource comprises means for determining information describing a printer located at the location defined by the future context.

Example 102 includes the subject matter of any of Examples 93-101, and wherein the means for determining information describing a computing resource comprises means for determining information describing a display located at the location defined by the future context.

Example 103 includes the subject matter of any of Examples 93-102, and wherein the means for determining information describing a computing resource comprises means for determining information describing a network connection of the location defined by the future context.

Example 104 includes the subject matter of any of Examples 93-103, and further including means for determining, on the resource database server, a recommendation associated with the location in response to receiving the request; and means for sending the recommendation from the resource database server to the mobile computing device.

Example 105 includes the subject matter of any of Examples 93-104, and wherein the means for determining the recommendation comprises means for determining a media content recommendation.

Example 106 includes the subject matter of any of Examples 93-105, and wherein the means for determining the media content recommendation comprises means for determining a recommendation for one of a video, song, e-book, or periodical.

Example 107 includes the subject matter of any of Examples 93-106, and wherein the means for determining the recommendation comprises means for determining a travel information recommendation.

Example 108 includes the subject matter of any of Examples 93-107, and wherein the means for determining the travel information recommendation comprises means for determining one of weather information, traffic information, or flight status information.

Example 109 includes the subject matter of any of Examples 93-108, and further including means for sending software for using the available resource from the resource database server to the mobile computing device.

Example 110 includes the subject matter of any of Examples 93-109, and wherein the means for sending the software comprises means for sending a device driver for the resource.

The invention claimed is:

1. A mobile computing device for resource management based on contextual planning comprising:
    a processor;
    a context analysis module to (i) identify a plurality of context domains associated with different roles of a user, (ii) receive a user selection of a subset of the plurality of context domains for analysis, (iii) detect an identifier of a geographic area in a user calendar associated with the mobile computing device and the selected subset of the context domains, (iv) analyze a historical user activity pattern associated with the geographic area to determine a location within the geographic area to determine a future context of the mobile computing device, (v) monitor a current context of the mobile computing device, (vi) and determine whether a location defined by the current context matches the location defined by the future context;

a communication module to (i) in response to the determination of the future context, send a request to a remote resource database server to request resource information associated with the location defined by the future context, wherein the request identifies the location and (ii) receive the requested resource information, wherein the requested resource information includes a driver associated with a resource located at the location defined by the future context; and a resource management module to configure, using the received resource information and in response to a determination that the location defined by the current context matches the location defined by the future context, the mobile computing device with the driver associated with the resource located at the location.

2. The mobile computing device of claim 1, wherein:
the communication module is further to send the request without direction from a user of the mobile computing device; and
the resource management module is further to configure the mobile computing device without direction from the user.

3. The mobile computing device of claim 1, further comprising a user notification module, wherein:
the communication module is further to receive a recommendation associated with the location from the remote resource database server; and
the user notification module is further to notify a user of the mobile computing device of the recommendation.

4. The mobile computing device of claim 3, wherein the recommendation comprises a travel information recommendation comprising one of weather information, traffic information, or flight status information.

5. The mobile computing device of claim 1, wherein to determine a location within the geographic area comprises to identify scheduled travel to a city and determine a facility within the city as the location, based on the historical user activity pattern.

6. The mobile computing device of claim 1, wherein to receive the requested resource information comprises to receive a driver for a printer at the location; and
wherein to configure the mobile computing device comprises to configure the mobile computing device to use the printer with the received driver.

7. A method for resource management on a mobile computing device comprising:
identifying, by the mobile computing device, a plurality of context domains associated with different roles of a user;
receiving, by the mobile computing device, a user selection of a subset of the plurality of context domains for analysis;
determining, on the mobile computing device, a future context of the mobile computing device by detecting an identifier of a geographic area in a user calendar associated with the mobile computing device and the selected subset of the context domains, and analyzing a historical user activity pattern associated with the geographic area to determine a location within the geographic area;
sending, in response to determining the future context, a request from the mobile computing device to a remote resource database server to request resource information associated with the location defined by the future context, wherein the request identifies the location;
receiving, on the mobile computing device, the requested resource information, wherein the requested resource information includes a driver associated with a resource located at the location defined by the future context;
monitoring, on the mobile computing device, a current context of the mobile computing device;
determining, on the mobile computing device, whether a location defined by the current context matches the location defined by the future context; and
configuring, using the received resource information and in response to a determination that the location defined by the current context matches the location defined by the future context, the mobile computing device with the driver associated with the resource located at the location.

8. The method of claim 7, wherein sending the request and configuring the mobile computing device comprises sending the request and configuring the mobile computing device without direction from a user of the mobile computing device.

9. The method of claim 7, wherein receiving the requested resource information comprises receiving information describing a display device located at the location defined by the future context, the method further comprising downloading, to the mobile computing device, media content to be displayed using the display device in response to receiving the information describing the display device.

10. One or more non-transitory machine readable storage media comprising a plurality of instructions that in response to being executed result in a mobile computing device:
identifying a plurality of context domains associated with different roles of a user;
receiving a user selection of a subset of the plurality of context domains for analysis;
determining, on the mobile computing device, a future context of the mobile computing device by detecting an identifier of a geographic area in a user calendar associated with the mobile computing device and the selected subset of the context domains, and analyzing a historical user activity pattern associated with the geographic area to determine the location within the geographic area;
sending, in response to determining the future context, a request from the mobile computing device to a remote resource database server to request resource information associated with the location defined by the future context, wherein the request identifies the location;
receiving, on the mobile computing device, the requested resource information, wherein the requested resource information includes a driver associated with a resource located at the location defined by the future context;
monitoring a current context of the mobile computing device;
determining whether a location defined by the current context matches the location defined by the future context; and
configuring, using the received resource information and in response to a determination that the location defined by the current context matches the location defined by the future context, the mobile computing device with a driver associated with the resource located at the location.

11. The non-transitory machine readable storage media of claim 10, wherein sending the request and configuring the mobile computing device comprises sending the request and configuring the mobile computing device without direction from a user of the mobile computing device.

12. The non-transitory machine readable storage media of claim 10, further comprising a plurality of instructions that in response to being executed result in the mobile computing device downloading, on the mobile computing device, software to use the resource located at the location.

\* \* \* \* \*